(12) United States Patent
Novak et al.

(10) Patent No.: US 9,738,549 B2
(45) Date of Patent: Aug. 22, 2017

(54) METHOD FOR SLUDGE OZONATION IN A WASTEWATER TREATMENT SYSTEM

(71) Applicants: Richard A. Novak, Naperville, IL (US); Malcolm E. Fabiyi, Chicago, IL (US)

(72) Inventors: Richard A. Novak, Naperville, IL (US); Malcolm E. Fabiyi, Chicago, IL (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 1030 days.

(21) Appl. No.: 13/685,330

(22) Filed: Nov. 26, 2012

(65) Prior Publication Data

US 2013/0140231 A1    Jun. 6, 2013

Related U.S. Application Data

(60) Provisional application No. 61/565,941, filed on Dec. 1, 2011.

(51) Int. Cl.
C02F 1/78 (2006.01)
C02F 3/30 (2006.01)
(Continued)

(52) U.S. Cl.
CPC ............. *C02F 1/78* (2013.01); *C02F 3/1221* (2013.01); *C02F 3/26* (2013.01); *C02F 3/301* (2013.01); *C02F 1/20* (2013.01); *C02F 3/006* (2013.01); *C02F 3/14* (2013.01); *C02F 2209/003* (2013.01); *C02F 2209/005* (2013.01); *C02F 2209/02* (2013.01); *C02F 2209/03* (2013.01); *C02F 2209/22* (2013.01);

*C02F 2209/225* (2013.01); *C02F 2209/23* (2013.01); *C02F 2209/245* (2013.01); *C02F 2209/38* (2013.01);
(Continued)

(58) Field of Classification Search
None
See application file for complete search history.

(56) References Cited

U.S. PATENT DOCUMENTS 4,178,239 A    12/1979    Lowther
4,370,235 A    1/1983     Suzuki et al.
(Continued)

FOREIGN PATENT DOCUMENTS

EP    0 645 347 B1    3/2000
EP    0 835 845 B1    9/2001
(Continued)

OTHER PUBLICATIONS

He et al. "Treating both wastewater and excess sludge with an innovative process" Journal of Environmental Sciences vol. 15, No. 6, pp. 749-756, 2003.*

*Primary Examiner* — Chester Barry
(74) *Attorney, Agent, or Firm* — Robert J. Hampsch

(57) ABSTRACT

Method and system for treating wastewater includes treating sludge with ozone in a plug-flow type reactor to cause lysis of biosolids in the sludge. The ozonated sludge may be provided to an anaerobic or anoxic section of the wastewater treatment system to aid the denitrification processes occurring in the anaerobic or anoxic section of the wastewater treatment system or to other sections of the wastewater treatment system such as a fermenter, an aerobic digester, or an anaerobic digester.

13 Claims, 7 Drawing Sheets

(51) Int. Cl.
*C02F 3/12* (2006.01)
*C02F 3/26* (2006.01)
*C02F 1/20* (2006.01)
*C02F 3/00* (2006.01)
*C02F 3/14* (2006.01)

(52) U.S. Cl.
CPC .... *C02F 2209/40* (2013.01); *C02F 2301/043* (2013.01); *C02F 2301/046* (2013.01); *C02F 2303/04* (2013.01); *C02F 2303/18* (2013.01); *Y02W 10/15* (2015.05)

(56) References Cited

U.S. PATENT DOCUMENTS

| | | | |
|---|---|---|---|
| 5,275,742 A * | 1/1994 | Satchell, Jr. | C02F 1/78 210/151 |
| 6,086,766 A | 7/2000 | Yasui | |
| 6,126,842 A | 10/2000 | Decker | |
| 6,146,521 A | 11/2000 | Yasui | |
| 6,592,767 B1 | 7/2003 | Yasui | |
| 6,773,597 B2 | 8/2004 | Zhang et al. | |
| 6,942,801 B2 | 9/2005 | Nishimura | |
| 7,147,780 B2 | 12/2006 | Campo et al. | |
| 7,513,999 B2 | 4/2009 | Fabiyi et al. | |
| 2004/0004038 A1 | 1/2004 | Yamaguchi et al. | |
| 2005/0133445 A1 | 6/2005 | Campo et al. | |
| 2006/0086661 A1 | 4/2006 | Campo et al. | |
| 2006/0169637 A1 | 8/2006 | Yamaguchi et al. | |
| 2008/0105614 A1 * | 5/2008 | Fabiyi | C02F 3/12 210/625 |

FOREIGN PATENT DOCUMENTS

| | | |
|---|---|---|
| EP | 0 903 325 B1 | 1/2003 |
| EP | 1 361 198 A1 | 11/2003 |
| EP | 1 541 532 A1 | 6/2005 |
| WO | WO 2004/026773 A1 | 4/2004 |
| WO | WO 2004/033371 A3 | 4/2004 |

* cited by examiner

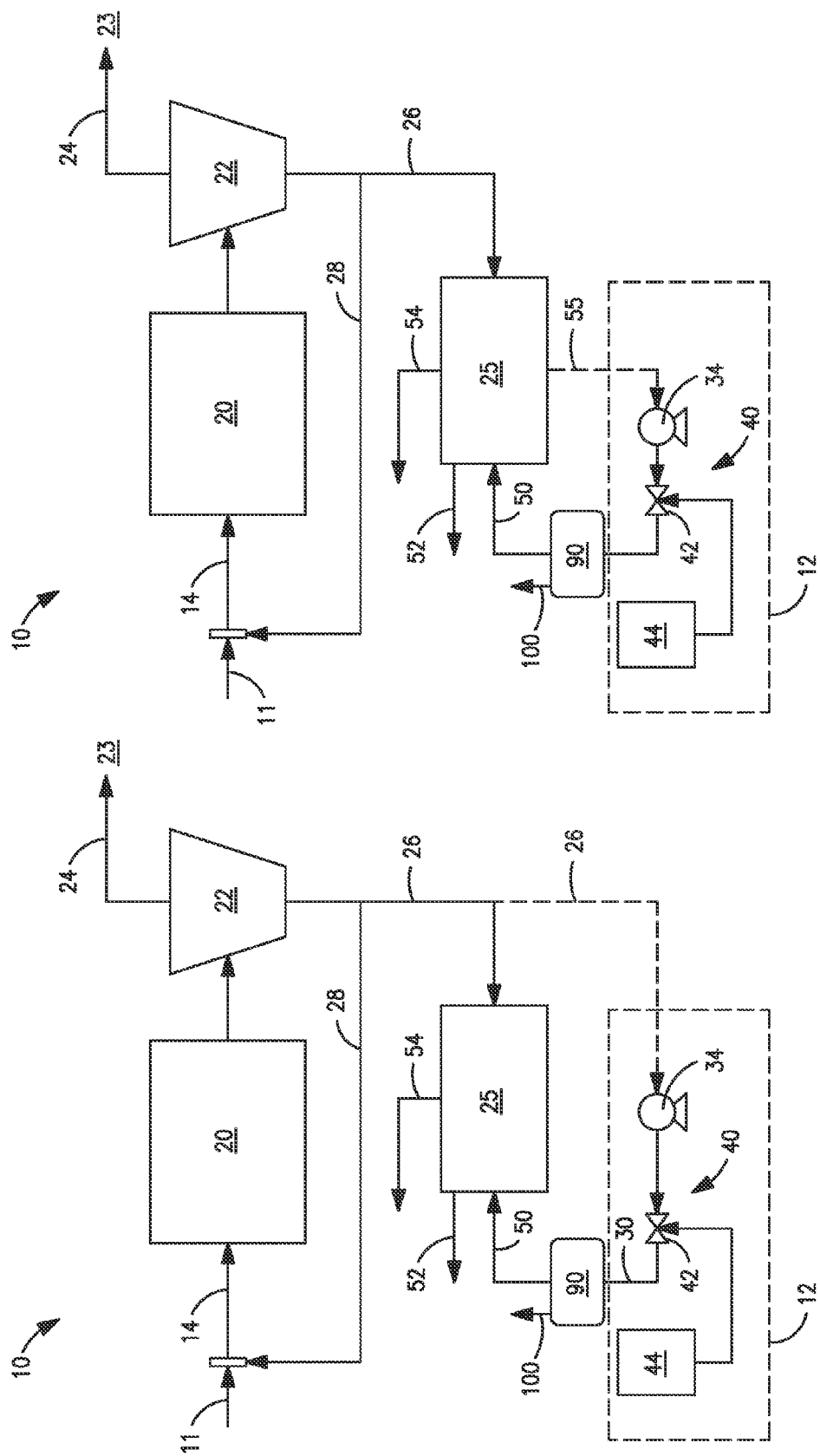

METHOD FOR SLUDGE OZONATION IN A WASTEWATER TREATMENT SYSTEM

CROSS REFERENCE TO RELATED APPLICATIONS

This application claims the benefit of U.S. provisional patent application Ser. No. 61/565,941 filed Dec. 1, 2011, the disclosure of which is incorporated by reference.

FIELD OF THE INVENTION

The present invention relates to methods and systems for wastewater treatment and more particularly, to the treatment of sludge with ozone in a high selectivity reactor, e.g., for purposes of enhancing or otherwise controlling wastewater treatment processes, including sludge digestion and nutrient removal processes.

BACKGROUND

Traditional methods of wastewater treatment involve bringing wastewater streams into contact with bacteria in an aerobic and/or anaerobic type process in what is known as activated sludge treatment. These bacteria consume parts of the substrate material or waste contained in the wastewater, which are typically organic compounds containing carbon, nitrogen, phosphorus, sulfur, and complex derivations thereof. Typically, a portion of the waste is consumed to further the metabolism of the bacterial cells or maintain the physiological functioning of the bacterial cells. In addition, a portion of the waste is consumed as part of the process of synthesis of new bacterial cells. The activated sludge treatment process yields a certain amount of sludge and associated solids which must be continuously removed from the treatment basin to maintain the steady state sludge balance which is critical to the effective functioning of the activated sludge treatment system. It is also important that when treating wastewater that the operator maintains the appropriate carbon, nitrogen and phosphorous (C/N/P) ratios or nutrient levels within the wastewater system. This is of particular concern where there may be regulated nutrient limitations such as many industrial wastewater treatment systems or in applications where biological phosphorus removal is required.

In order to maintain waste removal capacity of the treatment plant at steady state or other desired level, it is important to control the accumulation of new bacterial cells within the activated sludge treatment process. An excessive accumulation of new bacterial cells in excess of what is required for the treatment of the waste at or near steady state results in a deviation from optimal design considerations such as the Food to Mass ratio (F/M) or the Mixed Liquor Suspended Solids (MLSS) which are required to be within certain optimal ranges to allow for effective organic treatment and aeration efficiency. Thus, the excess biosolids must be continuously removed during the activated sludge treatment process.

Existing methods for dealing with the removal of sludge includes transporting the sludge to landfills, utilization of sludge for land application or agricultural purposes, and incineration of the sludge. Most sludge disposal operations require some prior treatment of the sludge; a process known in the art as solids handling. Solids handling processes are often costly and time consuming operations and typically involve one or more of the following steps: concentration of the sludge in a thickener, usually requiring the use of polymers; digestion of the sludge in order to stabilize the bacteria and to further reduce the volume and pathogen content of the sludge; dewatering of the sludge to reach approximately 15-25% solids content, which involves the passage of the sludge through centrifuges or other solid-liquid separation type devices; storage of the sludge; and transportation to sites for landfill, land application by farmers, or other end use.

It is estimated that the costs associated with solids handling and disposal processes can be between 20-60% of the total operating costs associated with the overall wastewater treatment process. Due to the cost and time associated with solids handling and disposal, it is beneficial to minimize the amount of excess sludge produced in the wastewater treatment process.

In conventional activated sludge treatment systems and methods, the use of ozone in addition to oxygen for the treatment of sludge has been reported. More particularly, ozone treatment of sludge has been reported in combination with mechanical agitators and/or pumps providing the motive mixing. The sludge-ozone contact typically occurs in a continuously stirred tank reaction (CSTR) mode, and lysis breaching of the integrity of the cell wall results as a consequence of the strong oxidizing action of ozone on the cell walls. Lysis leads to the release of the substrate rich cellular content of the bacterial cells. In this way, the solid cells which would otherwise have been discharged as excess sludge are lysed, and by so doing, are transformed to substrate which can then be consumed by bacteria in the treatment basin.

Different types of reactor systems are known for ozone treatment of sludge, including a CSTR, a higher selective plug flow reactor and a batch reactor system. The major difference between the different reactor modes lies fundamentally in: (i) the average amount of time that sludge stays within the reaction space, also known as the residence time; (ii) the interaction between reacting 'parcels' e.g., significant back-mixing in the CSTR and batch reactor systems whereas very limited back-mixing in the plug flow reactor system; and (iii) the yield or ozone dosing levels required to eliminate a volume of sludge.

SUMMARY OF INVENTION

Aspects of the invention may be broadly characterized as involving methods and systems for treating wastewater with ozone or other oxidizing agents for the processing and/or reduction of sludge, the control of foaming and bulking in portions of the wastewater treatment system, and/or the enhancement or other control of a digestion or nutrient-management process of the system.

The present invention may be characterized as a method of treating wastewater comprising the steps of: (i) receiving an influent of wastewater into a wastewater treatment system, the wastewater system having at least one anoxic or anaerobic section and at least one aerobic section; (ii) processing the wastewater in a bioreactor of the wastewater treatment system to produce sludge containing biosolids; (iii) diverting a portion of the sludge to a plug-flow type reactor; (iv) introducing ozone to the sludge in the plug-flow type reactor to induce or cause lysis of the biosolids in the sludge; and (v) providing the ozonated sludge to the wastewater treatment system, such as an anoxic basin, anaerobic basin, aerobic basin, aerobic or anaerobic digester, or a solid/liquid separation stage. Alternatively, a portion of the ozonated sludge may also be provided to a fermentation stage of the wastewater treatment system, wherein volatile organic acids are generated. The ozone may be generated specifically for the purpose of ozonating sludge or may be recycled from a different section of the wastewater treatment system.

Other advantageous aspects or features of the above-described method of ozonating sludge include additional steps of shearing the ozonated sludge using a homogenizer, ultrasound or other shearing methods. Alternatively, one can degas the ozonated sludge to reduce the oxygen content in the ozonated sludge prior to the discharge of the sludge to an anaerobic or anoxic portion of the treatment system, and recycle the gases removed from the ozonated sludge to an aerobic section of the wastewater treatment system.

The present invention may also be characterized a wastewater treatment system comprising: an anaerobic basin or anoxic basin arranged to receive a wastewater stream for anaerobic or anoxic microbial breakdown of material; a plug flow-type reactor configured to receive a sludge stream containing biosolids and introduce ozone to the sludge to induce lysis of the biosolids in the sludge; and a conduit arranged to provide the ozonated sludge from the plug flow type reactor to the anaerobic basin or anoxic basin.

In various embodiments of the present system, the plug flow-type reactor is configured to receive the sludge stream from the anaerobic basin or the anoxic basin, an aerobic basin; a return activated sludge line, a waste activated sludge line, or a digester.

In the above described system as well as the method of ozonating sludge for enhancing the nutrient-removal or nutrient-management process, the preferred level of ozone dosing is in a range of about 0.001 to 0.1 grams of ozone per 1.0 gram of total suspended solids in the sludge diverted to the plug-flow type reactor. The actual amount of ozone introduced, however, is preferably based or determined on the nutrient levels (such as nitrate levels or total nitrogen levels or phosphorus levels) detected in various sections of the wastewater treatment system. Ideally, the ozonated sludge will have a readily biodegradable chemical oxygen demand to nitrogen ratio of at least 4:1, more preferably at least 7:1, and up to about 10:1 or more and is used to increase the readily biodegradable chemical oxygen demand to nitrogen ratio in the anoxic or anaerobic section of the wastewater treatment system.

The present invention may also be characterized as a method of treating waste activated sludge in a wastewater treatment system comprising the steps of: (i) producing a stream of waste activated sludge containing biosolids; (ii) diverting a portion of the waste activated sludge containing biosolids to a plug-flow type reactor; (iii) introducing ozone to the waste activated sludge in the plug-flow type reactor to cause lysis of the biosolids in the sludge; and (iv) providing the ozonated sludge to the digester of the wastewater treatment system. The waste activated sludge may come from the WAS line, the digester, or even the waste solids draw exiting the digester. Also, where the digester is an anaerobic digester, it may be advantageous to degas the ozonated sludge prior to returning the ozonated sludge to the digester.

The present invention may be further characterized as a method of managing the nutrient levels in a wastewater treatment system comprising the steps of: (i) producing a stream of waste activated sludge containing biosolids; (ii) diverting a portion of the waste activated sludge containing biosolids to a plug-flow type reactor; (iii) introducing ozone to the waste activated sludge in the plug-flow type reactor to cause lysis of the biosolids in the sludge; and (iv) providing the ozonated sludge to a filtration or combined shear and dewatering system where the separation of the lysis products from the cellular debris and non lysed cells is effected, and wherein the discharge of the high nutrient filtrate or permeate from the filtration or dewatering step, to the wastewater treatment system such that the nitrogen and phosphorus contribution from the filtrate or centrate ensures that an appropriate nutrient balance is maintained in the nutrient system. Ideally, the nutrient balance reached when the filtrate or centrate from the ozonated sludge is combined with the influent load will be in the range of 100:5-10:0.5-2 BOD:N:P.

BRIEF DESCRIPTION OF THE DRAWINGS

The above and other aspects, features, and advantages of the present invention will be more apparent from the following, more detailed description thereof, presented in conjunction with the following drawings, wherein:

FIG. 7 is yet another embodiment of a wastewater treatment system in which sludge from the waste activated sludge stream is ozonated and provided to a digester;

FIG. 8 is yet another embodiment of a wastewater treatment system in which sludge from a digester is ozonated and returned to the digester;

DETAILED DESCRIPTION

The present system and method of sludge ozonation in a wastewater treatment system includes receiving an influent of wastewater into the wastewater treatment system. The influent may be raw wastewater, or wastewater that has been preprocessed in some way, such as by removing metals, solids, and other debris that cannot be easily biodegraded. The generation of sludge is a normal byproduct of wastewater treatment, and a portion of a stream of sludge in the wastewater treatment system may be diverted to a plug-flow type reactor.

As described in more detail below, the stream of sludge, which may include any suitable liquid and solid content including very low levels of solids, may be drawn from any location(s) in the wastewater treatment system, such as from an anoxic or other anaerobic basin, anoxic or other aerobic basin, a dewatering stage, a digester or fermenter, and/or any other suitable location or locations. Ozone gas is introduced to the sludge by the plug-flow type reactor to cause or induce lysis of biosolids in the sludge and create a flow of ozonated sludge.

The ozonated sludge is then provided or delivered to any suitable components within the wastewater treatment system, such as an anoxic basin, a solid/liquid separation stage, a digester, a fermenter, an aerobic basin. etc. The ozonated sludge may also be mixed with other non-ozonated sludge, e.g., introduced into a return activated sludge line carrying non-ozonated sludge, or may be mixed with other materials such as polymers, flocculants, acids or bases or other reagents, or may be provided to a wastewater treatment stage unmixed with other materials.

Sludge Ozonation for Enhancing the Denitrification Process

Figure 1:
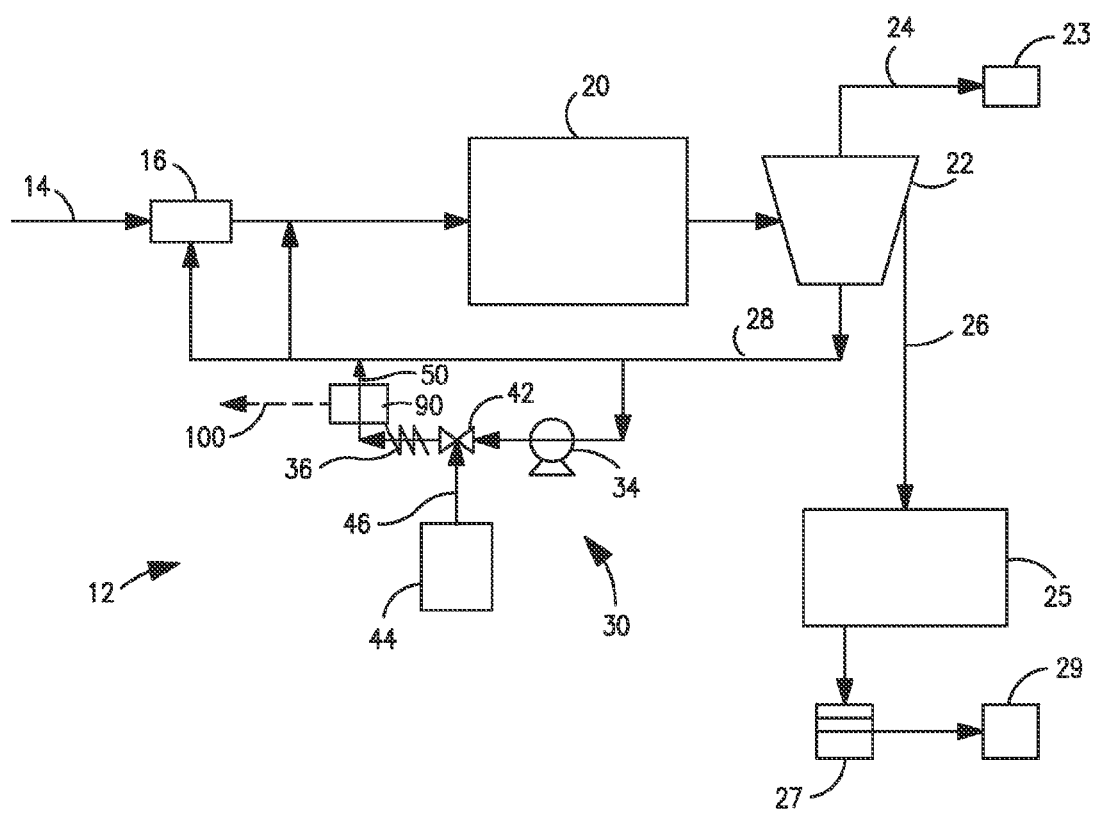
FIG. 1 is a schematic representation of a wastewater treatment system incorporating a sludge ozonation process for providing ozonated sludge to an anoxic or other anaerobic section of the wastewater treatment system.

FIG. 1 shows a schematic illustration of a wastewater treatment system 10 incorporating a sludge ozonation system 12. As seen therein, the wastewater treatment system 10 includes an intake conduit 14 adapted to receive an influent of wastewater, various pre-processing devices including an anoxic and/or anaerobic basin(s) 16, and an aerobic wastewater treatment reactor (e.g., an activated sludge basin) 20, which can include an aeration basin, membrane bioreactor, and/or other system intended for the purpose of using microbial life using aerobic processes to effect the removal of waste from water. The illustrated system also includes one or more clarifiers or filtration modules 22 downstream of the activated sludge basin 20 adapted to separate at least some liquid from a sludge flow, an output conduit 24 for transporting the effluent liquid to a discharge 23, a waste activated sludge (WAS) line 26 and a return activated sludge (RAS) line 28 adapted to transport and return the treated sludge stream back to the anoxic or anaerobic basin 16. In addition, the RAS line 28 may provide treated sludge to the activated sludge basin 20 or other high selectivity reactor.

Also shown are a digester 25 and dewatering device 27, which removes liquid from sludge in the WAS line 26 so the resulting dewatered sludge can be removed from the system, e.g., at holding area 29. Although the system 10 is shown to include various different components linked in a particular way, a wastewater system 10 arranged to incorporate one or more aspects of the invention may be arranged in other ways. For example, the digester 25, dewatering device 27 and other components such as degassers, fermenters, etc. are optional and may be eliminated or flow-wise positioned in other ways within the wastewater system 10. Also, other components may be included, such as strainers, clarifiers or filters to remove non-biodegradable or slowly biodegradable materials from the incoming wastewater stream.

Some of the biosolids or sludge included as part of the waste activated sludge in the clarifier(s) 22 are provided to the RAS line 28. As noted above, the sludge flow in the RAS line 28 may have any suitable liquid and solids content. Also, while in this embodiment the sludge provided to the RAS line 28 is processed by the clarifier 22, the diverted stream need not be treated or otherwise modified prior to entering the RAS line 28. Some of the sludge in the RAS line 28 may be diverted from the RAS line 28 to the sludge ozonation reactor 30 for ozonation processing. In this embodiment, the wastewater treatment system 10 and process involves treatment of at least part of the sludge in the RAS line 28 by a high selectivity treatment sludge ozonation reactor 30, which is preferably a plug flow type reactor 30 that either runs parallel to the RAS line 28 or is a sidestream from the RAS line 28.

As seen in FIG. 1, the sludge stream diverted to the sludge ozonation reactor 30 is passed through a pump 34 to a plug flow type reactor. The plug flow type reactor 30 includes a sufficient length of pipe 36 that together with the flow rate assures a residence time of the sludge in the plug flow reactor 30 that is adequate for ensuring effective dissolution of the ozone and reaction of the ozone with the biosolids. The illustrated embodiments also include one or more gas injection systems 40 through which an ozone-enriched gas is introduced to the plug flow reactor 30. The preferred gas injector systems 40 comprises a source of ozone-enriched gas and one or more nozzles or venturi type devices 42 for injecting the ozone-enriched gas into the sludge. Other components may be used to introduce ozone-containing gas to the sludge, including spargers and/or diffusers. In those embodiments where the initial ozone-containing gas-liquid contacting occurs in the RAS line 28 or at/near the plug flow reactor 30, the ozone-enriched gas may be supplied to a headspace above the liquid stream or may be supplied under pressure to a prescribed mixing region at a prescribed orientation relative to the liquid stream, e.g., the impeller region of a mechanically agitated gas-sludge contactor device or injecting devices, such as nozzles, spargers, and diffusers which are oriented at a prescribed angle and distance relative to the liquid surface.

Preferably, the source of ozone-enriched gas is an ozone generator 44 coupled to a source or supply of oxygen gas (not shown). Alternatively, the ozone-enriched gas stream 46 can be supplied from specialized on-site ozone storage systems. In yet other embodiments, the ozone may be obtained as recycled ozone that is generated and/or used in other portions of the wastewater treatment system 10, such as in the tertiary treatment of the treated water for disinfection, color and/or taste or odor removal prior to discharge or reuse. Preferably, the desired concentration of ozone is greater than or equal to about 4% to 16%. Higher concentrations of ozone may be preferable as such higher concentrations may help ensure that the gas to liquid ratio in the plug flow reactor is maintained within an optimal range.

The ozone-enriched gas is preferably supplied to the illustrated embodiment at nominal pressures and typically pressures lower than the operating pressures within the portion of the plug flow reactor 30 proximate to injecting devices 42. In this manner, the ozone-enriched gas is ingested into and through the injecting devices 42 by a vacuum draw generated by the pressure drop across the injecting devices 42. However, one skilled in the art will appreciate embodiments where the ozone-enriched gas is supplied at pressures higher than the pressure within the plug flow type reactor 30 or other gas-liquid contacting enclosure.

The gas injector system 40 also includes a suitable controlling means or mechanism that allows operative control of the injection rate, timing, and/or volume of ozone-enriched gas. Control of the gas injection rate, injection timing, and volume of ozone-enriched gas may be targeted to provide efficient gas-liquid contacting and to promote optimal dissolution of ozone into the liquid stream flowing through the plug flow reactor 30. More particularly, control of the gas injecting system may be adjusted to be within a prescribed range of gas flow to liquid flow ratio, wherein the gas flow is ascertained from the injection rate, timing and volume of gas through the injecting devices 42 and the liquid flow represents the flow of sludge through the plug flow reactor 30. A preferred range of gas to liquid ratio is less than or equal to about 1.0, although other ratios are possible. A suitable gas to liquid ratio may ensure that the gas or ozone is suitably dispersed in the liquid and/or that there is not an excess of gas in the fluid mix. For example, the above-described gas to liquid ratio together with other related flow characteristics may operate to achieve operation in desired two-phase (gas/liquid) flow regimes to promote good ozone dissolution and reaction. In some embodiments, a gas/liquid ratio is chosen to promote ozone dissolution and reaction while minimizing dissolution of oxygen gas.

Having passed through the plug flow type reactor 30, the now ozonated sludge is optionally circulated through a degassing unit (not shown) where the undissolved, mainly non-ozone gas stream is removed. The ozonated and degassed stream is returned via a return line 50 to the plant RAS line 28, which directs the combined ozonated sludge and non-ozone treated sludge in the RAS line 28 to the anoxic and/or anaerobic basin(s) 16. Additionally, the combined ozonated/non-ozonated sludge may be directed, in part, to the activated sludge basin 20 (e.g., an aerobic basin or basins). While directing at least partially ozonated sludge to an aerobic basin is known, e.g., from U.S. Pat. No. 7,513,999, introducing ozonated sludge to an anoxic or anaerobic basin or other anaerobic process stage has not been contemplated because of the potential for oxygenated sludge disrupting or adversely affecting the anaerobic processes in an anaerobic basin 20. That is, ozone treating sludge will invariably introduce some amount of ozone or other oxidant into the sludge, which may disrupt a delicate balance of organisms in an anaerobic basin 20. It is for this reason that ozonated sludge has been previously recommended for return to an aerobic stage of a wastewater treatment process. However, in accordance with key aspects of the invention, ozonated sludge can be introduced directly, or after optional dewatering, filtering, fermentation or other treatment of the ozonated sludge, into an anoxic or other anaerobic section of the wastewater treatment system without significant disruption of the anaerobic processes active therein. Moreover, the ozonated sludge are used to significantly raise COD levels in the anoxic and/or anaerobic basins 16, thereby improving denitrification processes in the wastewater treatment system, or enhancing the availability of volatile organic acids in anaerobic zones, thereby enhancing the growth of Phosphate Accumulating Organisms (PAOs) which are critical for the Biological Phosphorus Removal process.

The operating principles behind the disclosed sludge ozonation treatment system involve the contacting of the biosolids and dissolved ozone in a plug flow type reactor, in which the primary contact and reaction occurs between the oxidant (dissolved ozone) with the biosolids contained in the sludge. In the reaction between the ozone-enriched gas and the biosolids in the sludge within the plug flow reactor, the cell walls of the bacterial cells are breached or weakened as a result of the ozone induced chemical oxidation of the cellular walls of the bacteria. This breaching of the bacteria cell walls is known as lysis and it leads to the release of the cellular content of the bacterial cells. The cellular content is generally a liquid matrix which is comprised of proteins, lipids, polysaccharides and other sugars, DNA, RNA and organic ions. As a result of the lysis, the solid cells of the biosolids, which would otherwise have been accumulated and discharged in the solids handling process, are transformed to substrate COD components and subsequently consumed by the bacteria in the anoxic and/or anaerobic basins 16, the activated sludge treatment basin 20, or the digester 25 of the wastewater treatment system.

A plug-flow type reactor is used to achieve a high selectivity of the lysis reaction by providing for a narrow range of contact time between excess bacteria cells or biosolids and dissolved ozone, so that ozone is used only for, or predominately for, oxidation process leading to bacteria cell lysis (e.g., a "primary reaction"). Ideally, the ozone dosage and liquid-gas contact time is limited so as not to further oxidize the cell contents (e.g., cause "secondary reactions"). This provides for efficient use of ozone, leading to the maximum sludge reduction at the minimum ozone dosage. Preferred contact time ranges between about 10 to 60 seconds. This is in contrast to other ozone treatment systems, such as in stirred tanks, which do not provide precise contact time control of ozone with sludge.

In some embodiments, an amount of ozone used to lyse cells and other materials in the sludge in the plug flow reactor 30 may be closely controlled so as to reduce oxygen and/or ozone levels in sludge introduced into the anaerobic basin(s) 16. Thus, suitable amounts of bacteria and other material may be lysed to raise COD levels to a desired level while keeping oxidant levels in the returned sludge suitably low to have little or no impact on the anaerobic processes in the basin 16. In one illustrative embodiment, ozone may be introduced into the reactor 30 into the diverted portion of the sludge stream in the range of about 0.001 grams of ozone per 1.0 gram of total suspended solids TSS in the diverted portion of the stream. Higher levels of ozone may be used, such as up to 0.03 grams of ozone per 1.0 gram of total suspended solids TSS or potentially more. This may increase the COD/N ratio (or other measure of the ozonated sludge's ability to enhance denitrification in the treatment process) to levels of 4:1, 7:1, 10:1 or more. As a result, the COD/N ratio of material in the anaerobic basin 16 may be increased to desired levels (e.g., to enhance denitrification) of about 4:1 to 5:1, or more, which has been found to aid in denitrification of wastewater. Control of the amount of ozone introduced into the reactor 30 may typically be based on nitrate levels, total nitrogen levels or other parameters detected in a portion of the wastewater treatment system, such as in effluent from the activated sludge basin 20. For example, if denitrification processes are not operating at a sufficiently high level, an amount of ozone introduced into the reactor 30 may be increased or otherwise adjusted to increase COD levels in the anaerobic basin 16. Similarly, the amount of sludge ozone treatment may be adjusted based on target effluent phosphorus levels or waste sludge phosphorus content, to vary the plant nutrient balance thereby allowing maintenance of a healthy population of PAOs. A target value of COD/P would be in the range of about 10-25.

Alternatively, the plug flow-type reactor may be arranged to control an amount of ozone provided to a centrate stream with very low solids content, in which case the dosage of ozone is in the region of less than 1 mg ozone per mg of COD in the centrate stream. Such ozone treated sludge or centrate streams are then fed to a fermenter, where the COD from the lysed cells or the ozonated centrate stream enables the generation of Volatile Organic Compounds that are useful for enhancing the growth of Phosphorus Accumulating Organisms (PAOs). In this case, control of an amount of ozone introduced to the sludge may be based on Volatile Organic Acid levels detected in a portion of the wastewater treatment system.

Control of an amount of ozone introduced into the reactor 30 can be done, for example, by adjustments in ozone concentration in the gas flow and/or adjustments in flow rate of ozone-enriched gas injected into the sludge. Ozone dosage control is targeted to achieve the desired cell lysis activity. By keeping oxidant levels relatively low in the ozonated sludge, the ozonated sludge may have little or no impact on the anaerobic processes occurring in the anaerobic basin or fermenter to which the ozonated sludge is introduced.

Figure 9:
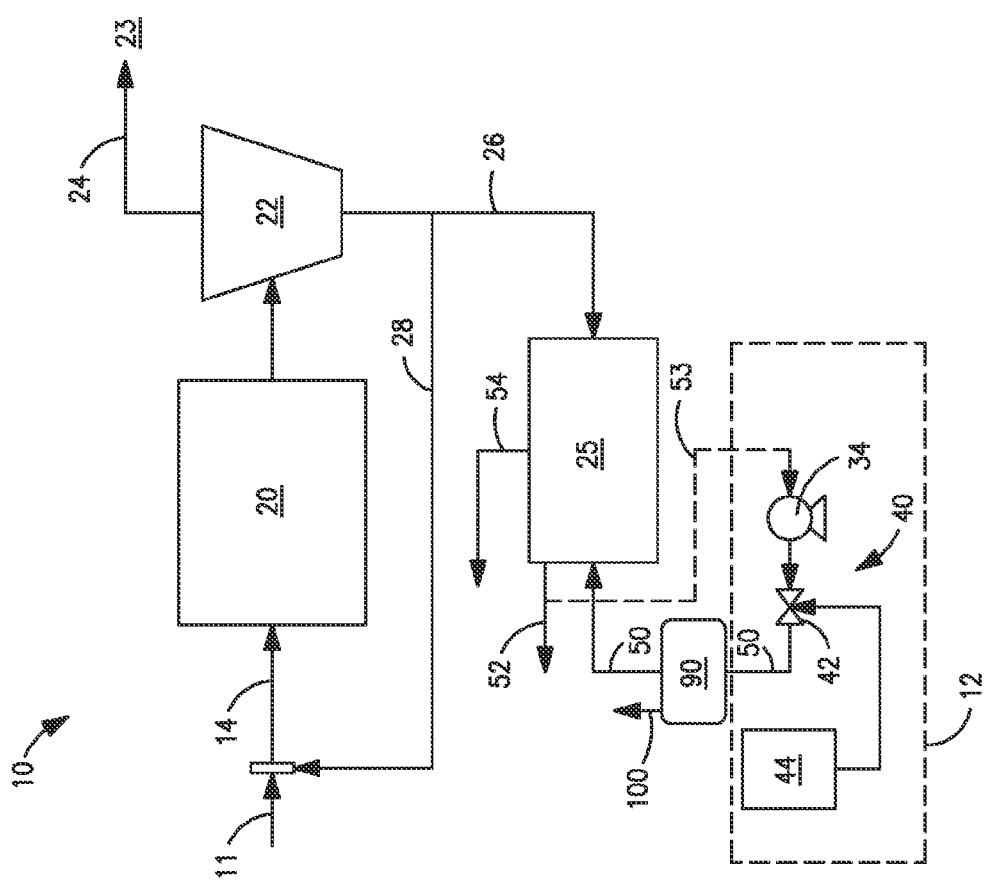
FIG. 9 is still another embodiment of a wastewater treatment system in which waste solids are subjected to an ozonation treatment and returned to the digester.

Referring now to FIGS. 7-9, after the plug flow type ozone reactor 30 there is an optional degassing unit 90 which will be used to control the quantities of oxidizing gases that are incorporated in the ozonated stream in the RAS line. The oxidizing gases 100 from the degassing process can be applied to the aerobic basin 20. Alternatively, the recovered gas may be introduced to other areas of the plant where oxygen may be beneficial, such as in the primary influent to control odor, to the secondary effluent to raise DO levels for discharge, or possibly to mix with biogas to enhance biogas combustion and increase the power output associated with the biogas and reduce unwanted emissions or deposits of siloxane compounds. At the end of the RAS line 28 or return line 50 may be an optional ejector mechanism, eductor, or exit nozzle arrangement (not shown) adapted to return the ozonated sludge at the surface, at a sufficient depth, and/or in other desired ways to the anaerobic basin 16 and/or the activated sludge basin 20. For example, returned sludge may be introduced to help ensure good mixing of the ozonated sludge with the bulk liquid in the anoxic and/or anaerobic basin 16 and/or the activated sludge basin 20.

Sludge Refining or Conditioning via Ozonation

While ozonation of sludge may be performed to enhance or otherwise control nutrient removal processes such as denitrification and biological phosphorus removal processes of the wastewater treatment system as described above, ozonation of sludge may also be performed for other additional reasons, such as sludge reduction or sludge conditioning such as changing floc characteristics, settling rates, extracellular polymer, etc. For sludge reduction purposes, the total volume flow rate through the plug flow reactor 30 may range from about 1 to about 40 times the equivalent volumetric flow rate of the waste activated sludge (WAS). This range may establish, at least in part, the optimum gas to liquid ratio within the plug flow reactor 30. Preferably, the gas to liquid ratio is less than or equal to about 1.0. Total sludge volumetric flow rate is adjustable and is preferably controlled in conjunction with the ozone concentration and ozone-enriched gas flow in the plug flow reactor, to achieve the desired level of reduction in sludge while minimizing the required ozone dosage.

Figure 2:
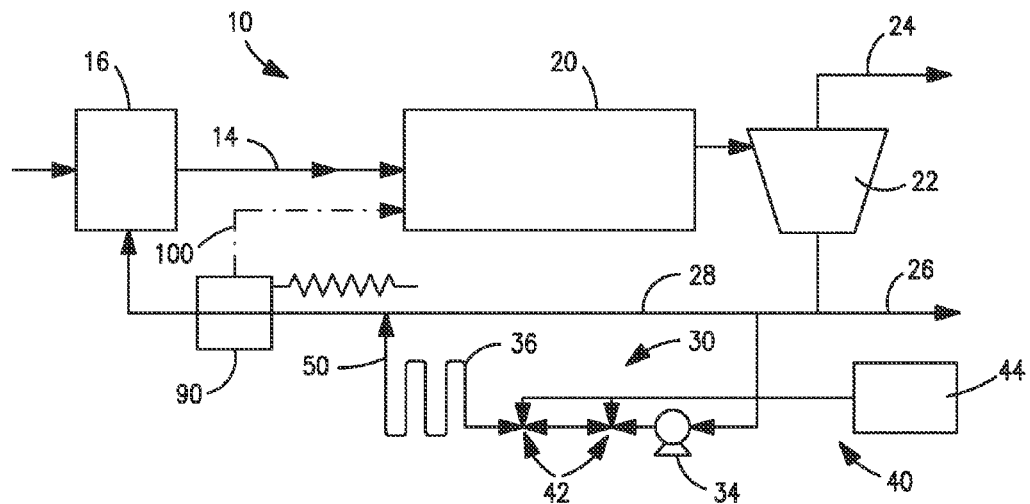
FIG. 2 is a schematic representation of an alternate embodiment of a wastewater treatment system wherein ozone-enriched gas is introduced at multiple locations within a high selectivity reactor and ozonated sludge is introduced only at an anoxic or an anaerobic section of the wastewater treatment system.

FIG. 2 shows an alternate embodiment of a wastewater treatment system and process. In this embodiment, ozone-enriched gas is injected or otherwise introduced at multiple locations 42 at or proximate to the plug flow reactor 30. Multiple point injection, in series or parallel configuration, using one or more nozzles, venturi-type devices or other components can be useful, e.g., to help precise control of ozone introduction and/or to otherwise realize improved gas-liquid contacting in the plug flow reactor 30. The embodiment of FIG. 2 also shows an arrangement in which ozonated sludge is optionally degassed for the removal of oxidizing gases in a degassing unit 90 and then processed through an optional filtration system 95 to further separate the lysate from ozonated sludge, and then transferred via a return conduit 50 to the RAS line 28, which then feeds the anaerobic basin 16 or other anaerobic sections/component(s) of the system 10. Thus, the RAS line 28 need not introduce sludge, whether partially ozonated or not, to the activated sludge basin 20. The oxidizing gases 100 from the degassing process can be applied to the aerobic basin 20, or other processes in the wastewater treatment process 10.

Figure 3:
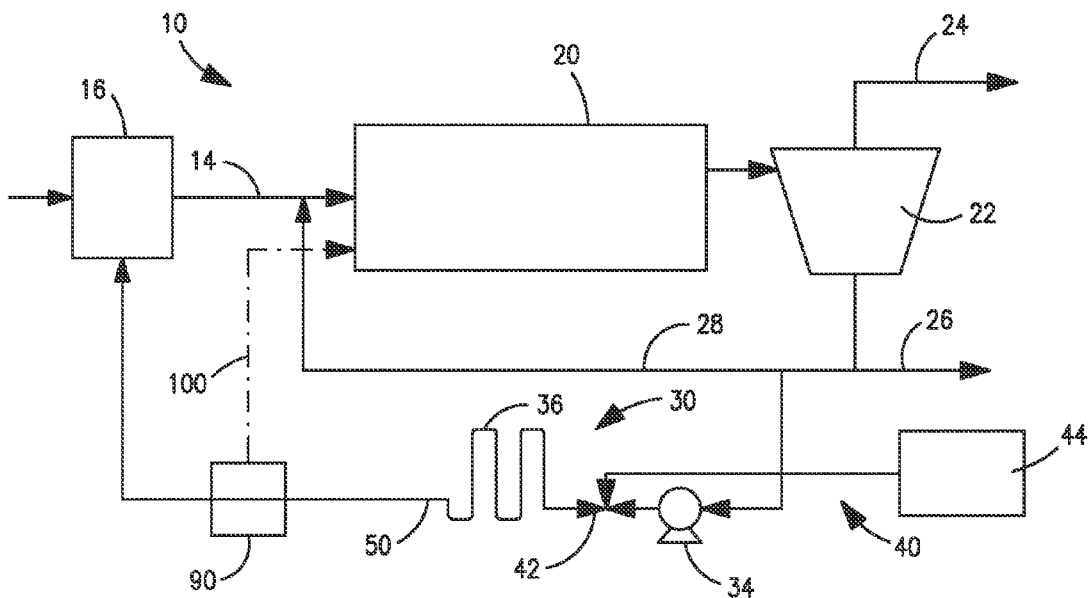
FIG. 3 is a schematic representation of another alternate embodiment a wastewater treatment system wherein the ozone-enriched gas is introduced at or near a pump associated with the reactor and non-ozonated sludge is returned to the activated sludge basin.

FIG. 3 shows another embodiment of a wastewater treatment system and process wherein the return conduit 50 from the high selectivity reactor 30 is returned directly to the anaerobic or anoxic basin 16 or other anaerobic component of the wastewater treatment system. Thus, ozonated sludge output from the reactor 30 need not necessarily be mixed with other return sludge that is not ozonated before being introduced to the anaerobic basin 16 or other anaerobic component or section of the wastewater treatment system. The FIG. 3 embodiment also includes a RAS line 28 that returns a portion of the sludge to the activated sludge basin 20, in this case without ozonation of the sludge. In such embodiments, it is also conceivable to inject chemical agents other than or in addition to ozone to the sludge stream in the RAS line 28, such as chlorine, biocides, polymers, odor control agents, or even other gas mixtures suitable to carry out the desired treatment process. Such additional or alternate processes may be added to the plug flow reactor 30 process as well. The ozonated sludge stream can be optionally degassed in a degassing unit (not shown) prior to transfer to the anoxic or anaerobic section of the wastewater treatment system. Another optional process step for the further extrusion of the lysis products from the ozonated cells can also be conducted prior to, or after the degassing unit. Such a process can comprise of filtration elements, centrifuge systems or presses.

Figure 4:
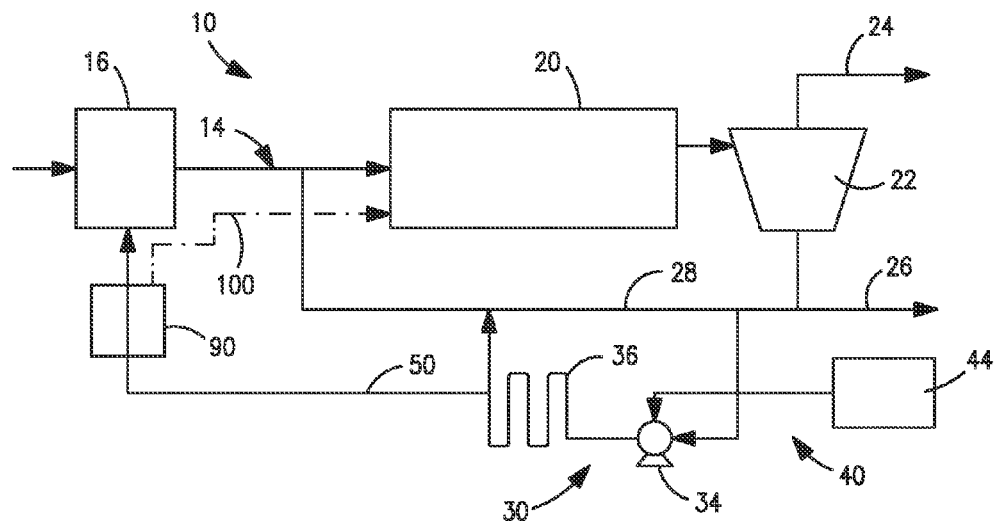
FIG. 4 is another embodiment of a wastewater treatment system where ozonated sludge is directed from the high selectivity reactor to an anaerobic component and a RAS line.

FIG. 4 illustrates yet another embodiment of a wastewater treatment system and process where the plug flow type reactor 30 includes a pump 34 and ozone-enriched gas injection system 40 adapted to inject the ozone-enriched gas at or near the pump 34. Introduction of ozone at or near the pump may help with mixing of the ozone with the sludge, e.g., by exploiting turbulence in the flow induced by the pump 34. The FIG. 4 embodiment also shows an arrangement in which the return conduit 50 of the reactor 30 is arranged to provide ozonated sludge to both the RAS line 28 and directly to the anaerobic basin 16 or other anaerobic section/component of the wastewater treatment system. Flow of ozonated sludge at the return conduit 50 may be controlled, e.g., by one or more valves, so as to control an amount of sludge provided to each ultimate destination. In addition, flow at the return conduit 50 may be controlled along with ozone introduction to the sludge to provide sludge with different levels of ozonation to the RAS line 28 and the anaerobic basin 16 or other anaerobic component. For example, during a first phase of operation, ozonation levels may be closely controlled to cause a desired level of lysis while keeping dissolved ozone or other oxidizing gas relatively low in the sludge. The sludge produced during this first phase of operation may be provided exclusively, or at least in part, to the anaerobic basin 16 or other anaerobic component. In a second phase of operation, ozonation levels may be increased to cause both cell lysis as well as increasing an oxygenation level of the sludge. The sludge produced during this second phase of operation may be provided exclusively, or at least in part, to the RAS line 28 for delivery to the activated sludge basin 20. Such an arrangement may help to enhance sludge reduction, while keeping a level of oxidizing gas introduced to the anaerobic basin 16 or other anaerobic component relatively low.

Figure 5:
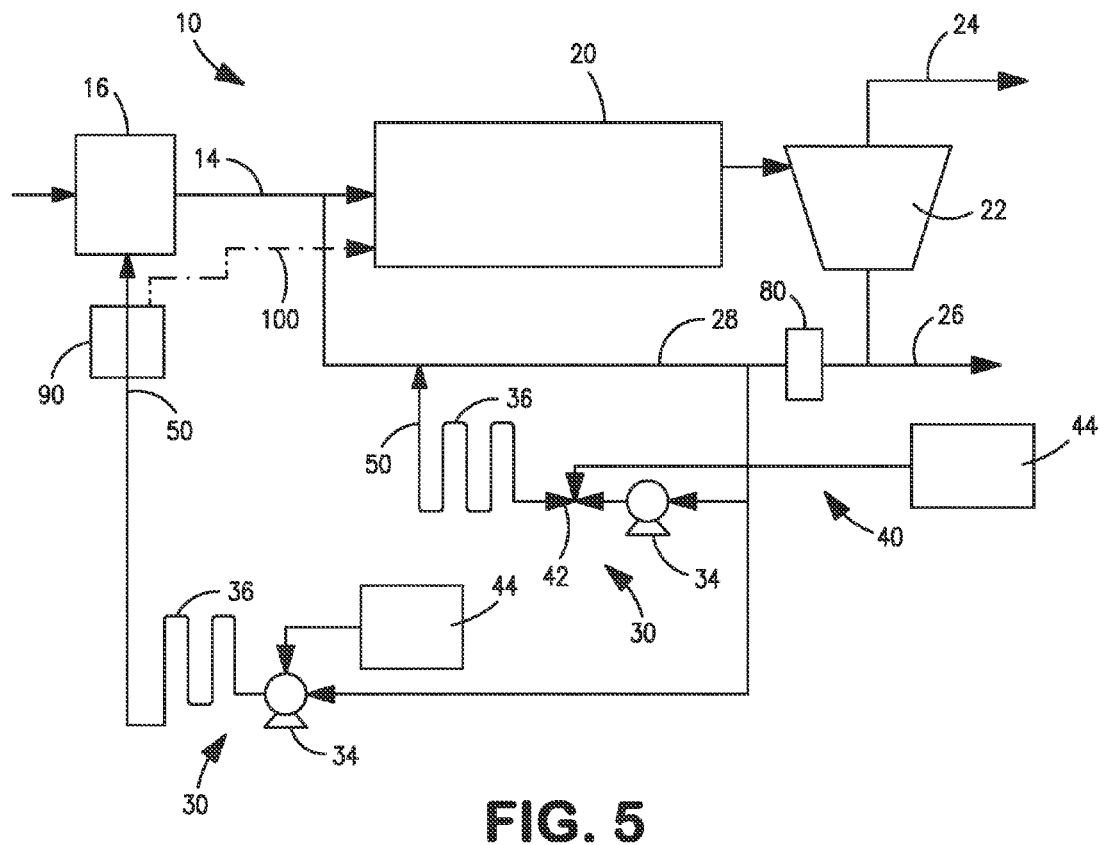
FIG. 5 is yet another alternate embodiment of a wastewater treatment system that includes two plug flow reactors.

FIG. 5 illustrates yet another embodiment of a wastewater treatment system and process where the sludge for treatment in the plug flow reactor 30 is pre-processed via a sludge thickener 80 or other device for concentration of solids. The thickener 80 may help adjust the sludge to a desired solids level, e.g., to help ensure proper operation of the ozone based plug flow type reactor(s) 30. Alternatively, or in addition, the sludge thickener 80 may be arranged to optionally dilute the sludge, e.g., with water, or be replaced with a component arranged to cause desired dilution, to yield a liquid stream with lower solids concentration entering the plug flow reactor(s) 30. In other arrangements, the sludge may be treated using other processes or components, such as a digester or other means for sludge stabilization or solids handling prior to diversion to the plug flow reactor. Still other sludge pre-treatment or post-treatment techniques compatible with the sludge ozonation system and process include the addition of solubilizing agents to the sludge, changing the pH, application of ultrasonic waves, homogenization, and other mixing or agitation means. Also, the use of chemical agents that facilitate the lysis of the bacteria cells or enhance the capacity for digestion of the sludge could be used.

In addition, the system 10 in FIG. 5 includes two plug flow reactors 30, i.e., one for sludge introduced to the anaerobic basin 16 or other anaerobic component, and one for sludge introduced to the activated sludge basin 20. (Although the reactors 30 are shown to operate in different ways, e.g., one arranged to introduce ozone at points 42 downstream of the pump 34 while the other is arranged to introduce ozone at or near the pump 34, the reactors 30 may be arranged to operate in any suitable way.) This arrangement may make control of the ozonation process, including properties of the sludge produced, easier because sludge provided to the anaerobic basin 16 or other anaerobic component and the activated sludge basin 20 may need to have different properties, such as oxidant levels, solids levels, flow rates, water content, and so on. For example, the source gas used in conjunction with the ozone generation system 44 could be different for the different reactors 30, and may comprise air, air enriched with oxygen, pure oxygen gas, or nearly pure oxygen gas. The use of nearly pure or pure oxygen gas as a source gas may be preferred for use in the reactor 30 that provides ozonated sludge to the activated sludge basin 20 because the biologic activity in the activated sludge basin 20 involves an aerobic process. In addition, the use of pure or nearly pure oxygen source gas and the injection of the ozone-enriched gas in or near the plug flow reactor could be controlled in a manner such that all or a substantial fraction of the overall oxygen requirement for biological treatment in the activated sludge process in the activated sludge basin 20 is provided by the sludge ozonation system. In contrast, the gas used by the reactor 30 that provides sludge to the anaerobic basin 16 may be different, e.g., may have substantially lower oxygen content.

While the two reactors 30 are shown receiving sludge from a same point on the RAS line 28 downstream of the sludge thickener 80 or other component, the reactors 30 may receive sludge from any suitable point in the process flow. For example, sludge provided to the anaerobic basin 16 or other anaerobic component may desirably have a lower water content than sludge provided to the activated sludge basin 20 (or vice versa), and thus the reactor 30 that provides ozonated sludge to the anaerobic basin 16 or other anaerobic component may receive sludge downstream of the sludge thickener 80, whereas the reactor 30 that provides sludge to the activated sludge basin 20 may receive sludge from upstream of the sludge thickener 80. The ozonated sludge stream that is transferred to the anoxic or anaerobic basin can be optionally degassed in the degassing unit. Optional process steps for the further extrusion of the lysis products from the ozonated cells may also be conducted prior to or after the degassing unit. Such processes may include filtration elements, centrifuge systems, presses, etc.

Figure 6:
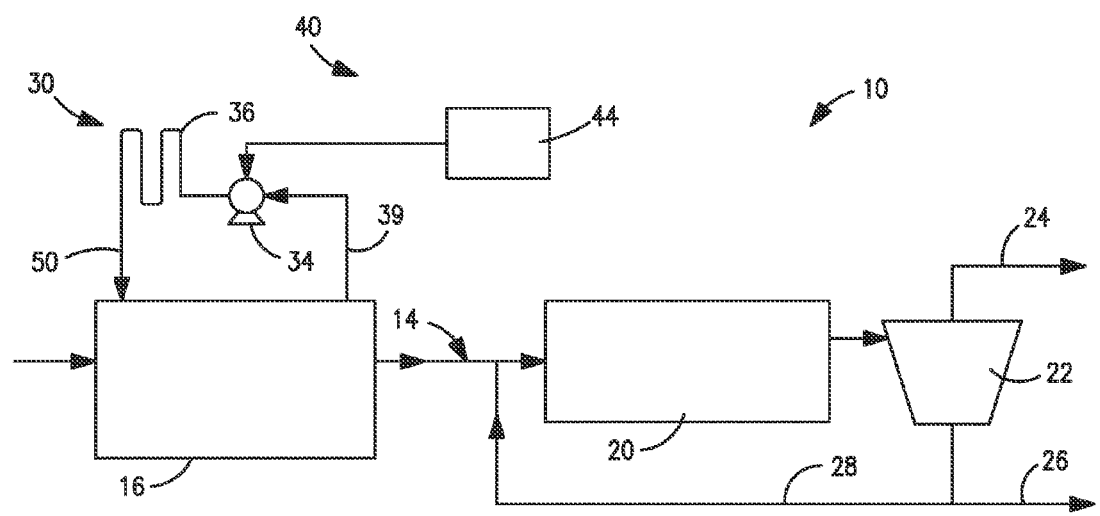
FIG. 6 is yet another embodiment of a wastewater treatment system in which sludge is removed from an anaerobic component for ozone treatment and returned thereto.

FIG. 6 depicts another alternate embodiment where sludge is drawn via a conduit 39 from the anaerobic basin 16 or other anaerobic component, ozonated by a reactor 30 and introduced back into the anaerobic basin 16 or other anaerobic component via the return conduit 50. Again, in this embodiment, it is conceivable to inject chemical agents other than ozone, such as chlorine, pH adjusting-agents, biocides, odor control agents, or even other gas mixtures such as carbon dioxide, nitrogen, oxygen, ozone, and mixtures thereof, suitable to carry out the desired treatment process to the sludge stream in the high selectivity treatment reactor 30. This embodiment also includes an RAS line 28 that returns sludge to the activated sludge basin 20 without ozone treatment. Again, the ozonated sludge stream can be optionally degassed in the degassing unit and further subjected to additional process steps for the further extrusion of the lysis products from the ozonated cells prior to or after the degassing unit. As indicated above, such processes may include of filtration elements, centrifuge systems, presses, etc.

Although the schematic depictions of wastewater treatment systems 10 herein show the anaerobic basin 16 or other anaerobic component as being separate from the activated sludge basin 20, the anaerobic basin 16 or other anaerobic component may be a substantially oxygen-free section at or near the head of the activated sludge basin 20 or other aerobic component. In other wastewater plant operations, the anaerobic basin 16 or other anaerobic component may include one or more tanks or basins separate from the activated sludge basin 20. Also, it should be understood that ozonated sludge may be provided to other anoxic or anaerobic components of a wastewater treatment system, such as some digesters or fermenters whether for the purposes of nitrification and/or denitrification or others.

The efficient and cost effective ozonation of sludge in the described embodiments may require the presence of three process conditions in the use of the ozone predominately for the lysis or breaching of the cells. The three process conditions include: (i) achieving a high selectivity for the lysis reaction; (ii) limiting exposure of the lysed cells to additional or excess ozone within the reactor; and (iii) maintaining a very narrow but optimized range of residence time distributions for the sludge and bacterial cells within the reactor. Limiting the exposure of the lysed cells to additional or excess ozone is essential as exposure to excess ozone could lead to the complete release of the cellular contents in the reactor and the subsequent costly chemical oxidation of the released material by the additional ozone. By the use of a plug flow reaction approach, all of these desirable process conditions can be realized within the reactor or contactor.

The plug flow reaction approach may be attained by designing the sludge-ozone flow to occur with minimal back-mixing, and to cause ozone contacting to occur mostly within a mostly tubular configuration. Specifically, the illustrated embodiments may have a prescribed or controlled residence time and the achievement of high selectivity of the lysis reaction. In the above-described embodiments, a plug-flow reaction is used to achieve a high selectivity of the lysis reaction by providing for a narrow range of contact time between cells and dissolved ozone, i.e. narrow residence time distribution, so that ozone is used only for the reactions leading to cell lysis "primary reactions", and so that ozonation does not continue so as to further oxidize the cell contents "secondary reactions" nor to oxidize the products of the secondary reactions "tertiary reactions". This may provide for the most efficient use of ozone, e.g., leading to maximum COD levels and/or sludge reduction at the minimum ozone dosage.

As described with respect to the illustrated embodiments, one or a multiplicity of gas injection points are employed to match the rate of ozone supplied for dissolution to the rate of reaction of biosolids with the dissolved ozone along the prescribed length of the plug flow reactor. This avoids over or under supply of ozone, promoting efficient use of ozone for cell lysis while avoiding use of ozone for oxidation of cell contents. Multiple injection points can also provide additional control of gas/liquid ratio within the reactor, to keep the multiphase flow conditions within desired ranges for efficient mass transfer and reaction while attaining the desired ozone application rate. One or more stages of gas/liquid separation may be employed in conjunction with the one or more gas injection points to provide further control of multiphase flow conditions within the reactor.

Of course, these basic sludge refining methods may be modified in a variety of suitable ways, such as by providing portions of the ozonated sludge to alternate destinations such as a fermentation stage of the wastewater treatment system, an activated sludge basin or other aerobic component (e.g. aerobic digester) of the wastewater treatment system, etc. Fermentation of ozonated sludge may be used to provide a source of volatile fatty acids (VFA), which may not only be part of COD in the sludge, but also help ensure biological phosphorus removal. In other embodiments, a supernatant may be removed from the ozonated sludge prior to being introduced into an anoxic basin, and/or the ozonated sludge may be treated in a digester or fermenter prior to being introduced into an anoxic basin.

In another contemplated embodiment, the ozonation of the sludge can be targeted to convert recalcitrant materials to biodegradable materials at some point within the wastewater treatment system. Recalcitrant materials may include pharmaceutical and personal care compounds, endocrine disrupting compounds, pesticides, etc. Upon conversion of the recalcitrant materials to biodegradable materials, the resulting biodegradable materials are returned for processing in the anaerobic, anoxic, or oxic basins of the wastewater treatment system or, if appropriate, in a digester or other solids line.

Sludge Ozonation Process to Enhance Sludge Digestion

Sludge digestion in a wastewater treatment system is utilized to help accomplish the following goals: (i) reduce the volume of the sludge that must be disposed; (ii) produce biogas or other useable energy from the sludge; (iii) reduce the amount of volatile organic compounds in the sludge; and/or (iv) improve subsequent dewatering of the waste sludge.

The digestion process is one of the most important sludge management practices used in wastewater treatment plants for achieving stabilization of sludge prior to disposal. Of these practices, aerobic digestion is a widely used stabilization process in plants with influent flows less than about 5 million GPD while anaerobic digestion is a more widely used sludge stabilization process in larger plants with influent flows greater than about 5 million GPD Anaerobic digestion is a series of processes in which micro-organisms break down biodegradable material in the absence of oxygen. The anaerobic digestion process operates in the absence of oxygen to transform some organic material in the waste sludge to a biogas consisting of methane, carbon dioxide and traces of other gases while reducing the overall quantity of suspended solids and, in particular, the destruction of volatile solids. The use of the biogas generated from wastewater treatment system as a form of renewable energy helps reduce dependence on fossil fuels.

Aerobic digestion is the process of oxidizing and decomposing the organic part of the waste activated sludge by micro-organisms in the presence of oxygen. In aerobic digesters, the micro-organisms or aerobic microbes feed on organic materials in the waste sludge to stabilize them, and reduce the overall suspended solids.

To enhance VSS reduction in this digestion process, a sludge ozonation technique using the plug flow type ozone reactor, described above, can be used. It has been found that sludge ozonation is an effective means of lysing cells to facilitate the rupture of the bacterial cell and enhancing VSS destruction in digesters. In particular, sludge ozonation of the waste activated sludge upstream of the digester (e.g. aerobic digester, anaerobic digester, ATAD, etc.) is applied to advantageously control the sludge particle size and overall sludge hydraulic behavior, to reduce foaming and/or to otherwise improve digester performance. In addition, sludge ozonation as part of, or upstream of, an aerobic digestion process increases VSS destruction whereas sludge ozonation as part of, or upstream of, an anaerobic digestion process increases both VSS destruction and biogas yield.

FIG. 7 shows an embodiment of a wastewater treatment system and process incorporating sludge ozonation process in conjunction with digestion of waste sludge. As seen therein, the wastewater treatment system 10 includes an intake conduit 14 adapted to receive an influent of wastewater, an aerobic wastewater treatment reactor (e.g., an activated sludge basin) 20, and one or more clarifiers 22 downstream of the activated sludge basin 20 adapted to separate at least some liquid from a sludge flow, an output conduit 24 for transporting the effluent liquid to a discharge 23, a waste activated sludge (WAS) line 26 and a return activated sludge (RAS) line 28 adapted to transport and return the a sludge stream back to the activated sludge basin 20. Also shown are a digester 25 configured to receive a portion of the WAS. The sludge ozonation aspect of the illustrated embodiment comprises an ozonating plug flow type reactor 30, a pump 34, and ozone-enriched gas injection system 40 adapted to inject the ozone-enriched gas generated from an ozone generator 44. The plug flow type reactor 30 is configured or arranged to receive a portion of the WAS. The preferred gas injector system 40 includes one or more nozzles or venturi type devices 42 for injecting the ozone-enriched gas into the sludge. Introduction of ozone gas proximate the pump 34 may assist with the gas-liquid mixing by exploiting turbulence in the flow induced by the pump 34. The illustrated embodiment also includes a return conduit 50 coupled to the plug flow type reactor 30 and arranged to provide the ozonated sludge back to the digester. Optionally, the disclosed ozone system includes a WAS holding tank ahead of the pump 34 which is capable of retaining a sufficient inventory of waste sludge from which the pump 34 then draws from. The quantity of sludge retained in the holding tank will be sufficient to enable a gas to liquid ratio of less than or equal to 1 to be maintained in the plug flow type ozone reactor system.

FIG. 8 also shows an embodiment of a wastewater treatment system incorporating the present sludge ozonation process in conjunction with digestion of waste sludge. As seen therein, the wastewater treatment system 10 includes an intake conduit 14 adapted to receive an influent of wastewater; an activated sludge basin 20; clarifier 22 adapted to separate at least some liquid from a sludge flow; an output conduit 24 for transporting the effluent liquid to a discharge a waste activated sludge (WAS) line 26; and a return activated sludge (RAS) line 28 adapted to transport and return the a sludge stream back to the activated sludge basin 20. Also shown in FIG. 8 are a digester 25 configured to receive the WAS. The sludge ozonation aspect of the illustrated embodiment comprises an ozonating plug flow type reactor 30, a pump 34, and ozone-enriched gas injection system 40 adapted to inject the ozone-enriched gas generated from an ozone generator 44. The plug flow type reactor 30 is configured or arranged to receive a sludge stream from the digester 25 and recycle the ozonated sludge back to the digester 25 via return conduit 50. The preferred gas injector system 40 includes one or more nozzles or venturi type devices 42 for injecting the ozone-enriched gas into the sludge. The energy provided by the sidestream loop (sludge inlet 55, pump 34, through separator 90 and return line 50) to digester 25 can offset mixing energy normally required in digester 25 to provide efficient digester operation.

FIG. 9 shows yet another embodiment of a wastewater treatment system incorporating the present sludge ozonation process in conjunction with digestion of waste sludge. Similar to the embodiment of FIG. 8, the wastewater treatment system 10 of FIG. 9 includes an intake conduit 14 adapted to receive an influent of wastewater; an activated sludge basin 20; clarifier 22 adapted to separate at least some liquid from a sludge flow; an output conduit 24 for transporting the effluent liquid to a discharge a waste activated sludge (WAS) line 26; and a return activated sludge (RAS) line 28 adapted to transport and return the a sludge stream back to the activated sludge basin 20. The digester 25 is also arranged or configured to receive the WAS. The ozonating plug flow type reactor 30 is configured to receive a waste sludge stream exiting digester 25 and recycle the ozonated sludge back to the digester 25 via return conduit 50. Stream 52 can be a final waste stream from the digestion process, or may be an intermediate stream between digestion stages. For example, stream 52 may be passed from a first digestion stage to a second digestion stage. In the case where more than one stage of digestion is employed, the ozonated sludge stream 50 may be returned to one or more stages of the digestion process. Optionally, where there are several digestion stages, the sludge stream to be ozonated could be taken from the final stage and returned to that stage or any of the preceding stages. Furthermore, the ozonated sludge from one stage, can be split between stages when returned to the digestion process. Additionally, the ozonated sludge can be drawn from any, a combination of, or all of the stages in a multi-staged digestion system.

Referring again to the embodiments illustrated in FIG. 7, FIG. 8, and FIG. 9, an optional degassing unit 90 is shown. In applications where the digester 25 is an anaerobic digester, the ozonated sludge is preferably degassed for the removal of oxidizing gases in a degassing unit 90 and then returned as a lysed sludge via a return conduit 50 to the digester 25. The oxidizing gases 100 from the degassing process can be optionally recycled to the aerobic basin 20 or other processes in the wastewater treatment system that benefit from oxygen injection, such as the primary influent for odor control or the secondary effluent for maintaining desired dissolved oxygen levels for discharge.

Conversely, in applications where the digester 25 is an aerobic digester, the ozonated sludge is preferably returned directly via the return conduit 50 to the digester 25 wherein the oxidizing gases in the ozonated sludge aid in the aerobic digestion process so as to minimize energy cost or oxygen costs associated with the operation of the aerobic digester.

Although not shown, the disclosed embodiments also preferably include one or more automated control valves used to govern the flows through the system. Control of the ozonation process for digesters is also a key aspect of the presently disclosed embodiments. Specifically, the above described embodiments would include a microprocessor based control system and associated monitoring systems. Ozonation control should be configured to produce efficient and effective ozone dosing levels; optimize the gas/liquid mixing; optimize digester performance; and advantageously optimize the biogas yield and biogas quality. Control of the system is typically effected by monitoring key operational parameters of the wastewater treatment system and adjusting ozone injection; pump speeds, degassing unit operation, flow control valves, sludge retention time in response thereto.

Example

The benefits of employing sludge ozonation to enhance the digestion process were demonstrated at a municipal wastewater treatment plant. The plant treats up to 30,000 Person Equivalents (PE) of influent wastewater in two parallel trains. One train treats a third of the flow (10,000 PE) while the other train handles two thirds (20,000 PE) of the influent capacity. Sludge stabilization at the municipal wastewater treatment plant facility is handled using an aerobic digester having a capacity of about 900 m$^3$. About 100 m$^3$ of waste activated sludge (WAS) having a TSS of approximately 7000 mg/L is fed to the digester each day. The municipal wastewater treatment plant has a 155 kW compressor that provides the aeration requirements of the combined secondary activated sludge basin and aerobic digester sections of the plant. Aeration is provided at the plant using a fine bubble diffuser system Airflow to the aerobic digester is controlled to maintain dissolved oxygen level of about 1 ppm.

Pilot testing of a sludge ozonation system was undertaken between to test the viability of ozone for sludge reduction. The pilot testing compared the digester performance using the present sludge ozonation process applied to the 20,000 PE line to digester performance without the sludge ozonation process. Sludge drawn from the aerobic digester on the 20,000 PE line was circulated through a plug flow type sludge ozonation system. The installed plug flow type reactor included a pump that could handle up to 70 m$^3$/hr of flow. The applied ozone dosages ranged from about 0.06 kg/hr to about 0.67 kg/hr. The ozone gas was aspirated into the plug flow type reactor using a venturi.

Figure 10:
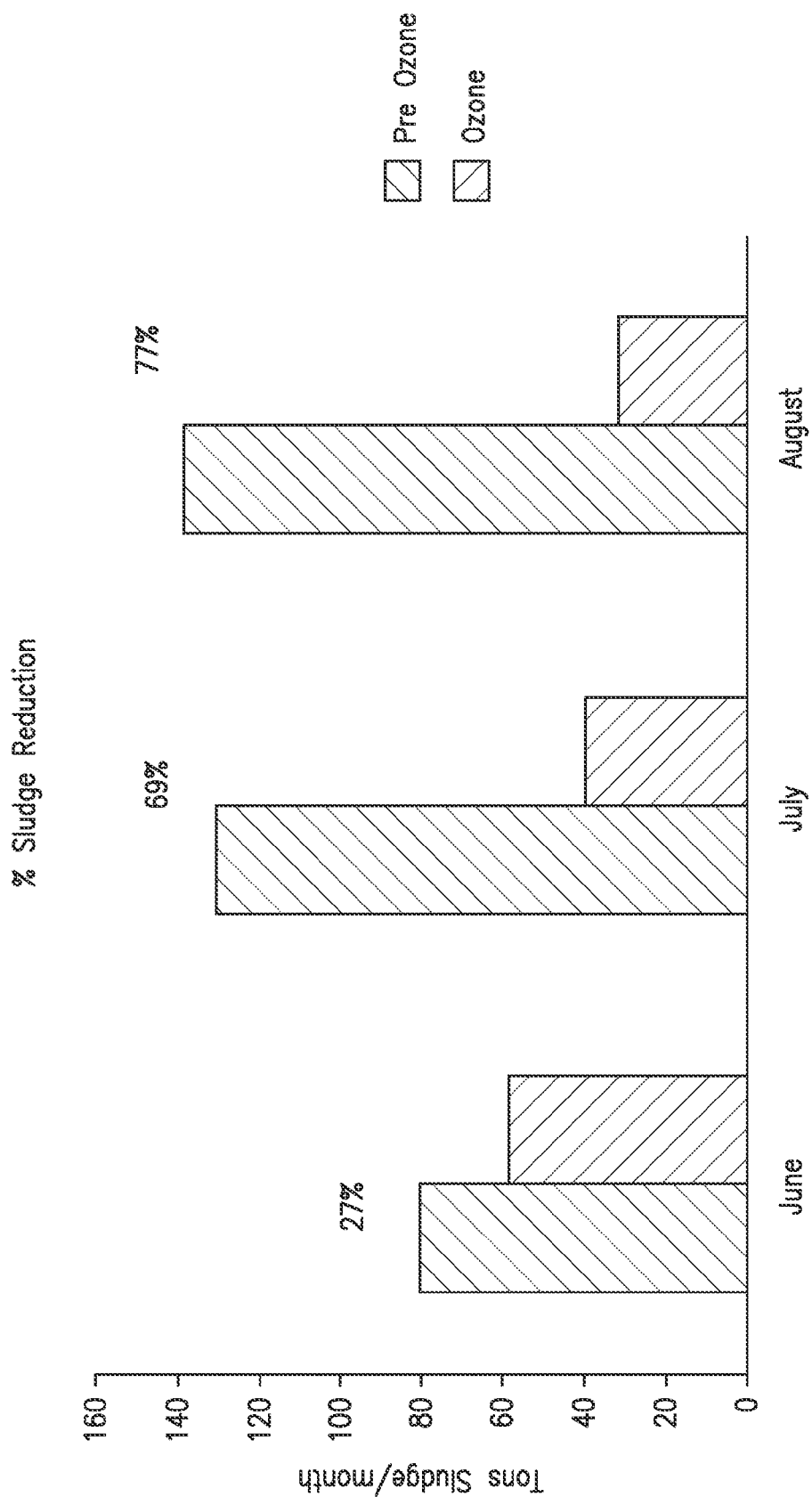
FIG. 10 is a graph that depicts the sludge reduction at a municipal wastewater treatment plant when using the sludge ozonation process in a digester in accordance with the present invention during the summer months compared to no sludge ozonation in the digester.

The results depicted in FIG. 10, show that when sludge ozonation in a plug flow type reactor is used in conjunction with digestion treatment process at the municipal wastewater treatment plant, a solids reduction of up to about 77% is achieved compared to the baseline plant operation without sludge ozonation in the digester. For purposes of this Example, plant performance is characterized as tons of sludge produced at the municipal wastewater treatment plant for each of the months shown. The baseline plant performance represents an average of the tons of sludge produced during that indicated month in the prior two years at the same wastewater treatment facility with no sludge ozonation and standard digester operation. Specifically, the municipal wastewater plant demonstrated an average of 27% reduction in tons of sludge produced during the month of June when using sludge ozonation in the digester compared to non-ozonated sludge. Similarly, the municipal wastewater plant demonstrated an average of 69% and 77% reduction improvement in tons of sludge produced during the month of July and August, respectively when using sludge ozonation in conjunction with the digester compared to sludge production without ozonation.

More surprisingly, the specific ozone utilization values obtained during the pilot tests depicted in FIG. 10 were about 0.01 to 0.03 kg $O_3$/kg TSS eliminated or removed. As seen in Table 2 below, this specific ozone utilization•value of the plug flow reactor sludge ozonation system when applied or coupled to a RAS or a digester is about an order of magnitude lower than prior art CSTR based sludge ozonation systems. Significant enhancements to sludge settling and dewatering characteristics were also observed when applying waste sludge ozonation using the plug flow type reactor system as a pretreatment to digesters.

TABLE 1

| Reference | Ozone Usage kg O3/kg SS reduced | Reactor Mode |
| --- | --- | --- |
| Yasui et al (1996) | 0.165 | CSTR |
| Sakai et al (1997) | 0.133-0.178 | CSTR |
| Kobayashi et al (2001) | 0.250 | CSTR |
| Slevers et al (2004) | 0.395 | CSTR |
| PFR in RAS | 0.05 | PFR |
| PFR in Digester | 0.01-0.03 | PFR |
| WERF 2004 Sludge Minimization Study* | 0.2-0.4 | CSTR |

Sludge Ozonation for Foam and Bulking Control

Foaming and bulking problems in wastewater treatment operations are generally caused by the presence of an abundance of filamentous bacteria such as Nocardia and Parvicella in the wastewater. The present sludge ozonation process in a plug flow type reactor or other high selectivity reactor can be tailored to reduce filamentous bacteria populations which, in turn, lead to a reduction or elimination in foam and a reduction in bulking in the aerobic basin, the digesters, or the anoxic/anaerobic sections of the wastewater treatment system.

For purposes of controlling foaming and bulking, the introduction of ozone into a diverted stream within the plug flow type reactor or other high selectivity reactor is preferably a tightly controlled process. In particular, the ozone used during such ozonation process for foam and bulking control is preferably maintained within the range of about 0.04 to about 5.0 g of ozone per day per kg of sludge in the aerobic basin, and more preferably the range of about 0.1 to about 1.5 g of ozone per day per kg of sludge in the aerobic basin. By using such optimized, small dosages of ozone, the ozone reaction within the plug flow type reactor or other high selectivity reactor is concentrated on the filamentous organisms with minimal impact on other microbial populations. Excessive dosages of ozone will affect the non-filamentous organisms in addition to the filamentous organisms. Higher ozone dosages may also be employed, depending on the degree of general cell lysis desired in addition to filament control.

Ozone Dosing

In utilizing the presently disclosed embodiments of the described sludge ozonation process, it is desirable to control selected parameters, either through design of the system or in operation of the system. Preferably, the rate of ozone supplied for dissolution is correlated to the rate of reaction of biosolids with the dissolved ozone along the length of the plug flow reactor. This correlation of the ozone supply with the rate of biosolids reaction within the plug flow reactor avoids over-supply or under-supply of ozone and thereby promotes the efficient use of ozone for cell lysis while avoiding the use of ozone gas for the secondary reactions. Preferably, by varying the volume of sludge that is diverted and processed through the plug flow type reactor, closely managing the residence time distribution of the sludge within the plug flow type reactor, or varying the ozone dosage, it is possible to precisely control the ozonation of the sludge.

Alternatively, the high selectivity or plug flow type reactors can be designed and operated in a manner where several passes through the reactor are required to achieve the desired ozonation results. Operating the system with several passes of the sludge through the reactor may also allow operation under a desired upper limit of gas-to-liquid ratio, to maintain the desired multiphase flow characteristics in the reactor for efficient mass transfer and reaction.

Where the purpose of the sludge ozonation is to optimize sludge reduction and the ozonated sludge is returned to the aeration basin, the ozone dosage in the plug flow reactor is preferably within the range of about 0.04 g to about 40.0 g of ozone per day per kg of sludge, and more preferably in the range of about 1.0 g to about 20.0 g of ozone per day per kg of sludge to ensure the ozonation of both filamentous organisms and non-filamentous organisms, and still more preferably, in the range of about 2.0 g to about 6.0 g of ozone per day per kg of sludge. The preferred residence time distribution in the plug flow type reactor for such application ranges from about 10 seconds to about 60 seconds Where the purpose of the sludge ozonation is to enhance the nutrient balance in the wastewater treatment process, such as providing additional readily-degradable carbon source for the denitrification process in an anoxic, aerobic or anaerobic section of the wastewater treatment system, the ozone dosage is preferably within the range that is needed to maintain the COD to nitrogen ratio and/or the COD to phosphorous levels within the appropriate ranges (e.g. COD to nitrogen ratio of at least 4:1). More particularly, the ozone dosage in the plug flow reactor is preferably within the range of about 0.1 g to about 40.0 g of ozone per day per kg of sludge, and more preferably in the range of about 0.3 g to about 20.0 g of ozone per day per kg of sludge to ensure the appropriate COD to nitrogen ratio and/or the COD to phosphorous levels. The preferred residence time distribution in the plug flow type reactor in this application ranges from about 10 seconds to about 60 seconds. However, it is to be understood that lower residence times should be employed in applications or configurations where one should avoid enhancing oxygen solubility of the treated stream, for example, when feeding the ozone treated stream to an anoxic or anaerobic basin.

Where the purpose of the sludge ozonation is to enhance the digestion process in an anaerobic or aerobic digester, the ozone dosage of the treated sludge is preferably within the range of about 0.04 g to 30 g of ozone per kg of total suspended solids in the treated stream, and more preferably within the range of about 0.01 g to 10 g of ozone per kg of total suspended solids in the treated stream The preferred residence time distribution in the plug flow type reactor in this application ranges from about 10 seconds to about 60 seconds.

The above-identified methods and systems for the treatment of sludge using ozone can be utilized alone or in conjunction with other sludge reduction or other processing techniques. In addition to sludge reduction, other advantages and objectives of the present sludge ozonation techniques include sludge conditioning, managing nutrient levels (C/N/P), altering the sludge floc for enhanced settling or digester operation, cell lysis for enhanced digestion, as well as converting non-biodegradable material to biodegradable form.

Moreover, each of the specific steps involved in the preferred process, described herein, and each of the components in the preferred systems are easily modified or tailored to meet the peculiar design and operational requirements of a particular treatment system. For example, the sludge to be ozonated in the present methods and systems can be return activated sludge, waste activated sludge, waste solids draw, or any combination of primary and secondary solids.

While the invention herein disclosed has been described by means of specific embodiments and processes associated therewith, numerous modifications and variations can be made thereto by those skilled in the art without departing from the scope of the invention as set forth in the claims or sacrificing all its material advantages.

The invention claimed is:

1. A method of treating wastewater comprising the steps of:
    receiving an influent of wastewater into a wastewater treatment system, the wastewater treatment system having at least one anoxic or anaerobic section and at least one aerobic section;
    processing the wastewater in the at least one anoxic or anaerobic section and in the at least one aerobic section to produce sludge containing biosolids;
    diverting a portion of the biosolids containing sludge to a plug-flow type reactor;
    introducing ozone to the biosolids containing sludge in the plug-flow type reactor to cause lysis of the biosolids in the sludge; and
    returning a portion of the ozonated sludge to the at least one anoxic or anaerobic section of the wastewater treatment system wherein a chemical oxygen demand to nitrogen ratio of material in the anoxic or anaerobic section is increased to greater than about 4:1 to aid in denitrification of the wastewater in the anoxic or anaerobic section of the wastewater treatment system.

2. The method of claim 1, further comprising the step of shearing the ozonated sludge.

3. The method of claim 1, wherein the at least one anoxic or anaerobic section of the wastewater treatment system comprises an anoxic basin, anaerobic basin, anaerobic digester, or a solid/liquid separation stage.

4. The method of claim 1, further comprising providing a portion of the ozonated sludge to a fermentation stage of the wastewater treatment system, wherein volatile organic acids are generated in the fermentation stage.

5. The method of claim 1, further comprising the steps of:
    degassing the ozonated sludge to reduce the oxygen content in the ozonated sludge to a prescribed level; and
    recycling the gases removed from the ozonated sludge to an aerobic section or other sections within the wastewater treatment system.

6. The method of claim 1, wherein the step of introducing ozone further comprises introducing ozone in a range of about 0.01 to 1.0 grams of ozone per kg of total suspended solids in the sludge diverted to the plug-flow type reactor.

7. The method of claim 6, wherein the amount of ozone introduced to the sludge in the plug flow type reactor is determined based on: (i) the nitrate or total nitrogen levels detected in a section of the wastewater treatment system; or (ii) the phosphorous levels in an effluent or in the waste activated sludge.

8. The method of claim 1, wherein the ozonated sludge has a chemical oxygen demand to nitrogen ratio of at least 4:1.

9. The method of claim 1, wherein the ozonated sludge has a chemical oxygen demand to phosphorus ratio of at least 25:1.

10. The method of claim 1, wherein the ozonated sludge has a chemical oxygen demand to nitrogen ratio greater than the chemical oxygen demand to nitrogen ratio in the anoxic or anaerobic section of the wastewater treatment system or a chemical oxygen demand to phosphorous ratio greater than the chemical oxygen demand to phosphorous ratio in the anoxic or anaerobic section of the wastewater treatment system.

11. The method of claim 1, further comprising the step of treating the ozonated sludge in a digester or a fermenter prior to the step of providing the ozonated sludge to the anoxic portion of the wastewater treatment system.

12. The method of claim 1, further comprising the steps of:
    removing a supernatant using solid/liquid separation of the ozonated sludge stream wherein said ozonated sludge is particularly rich in soluble chemical oxygen demand and wherein said supernatant;
    optionally recovering phosphorus from the supernatant; and
    providing the supernatant to the anoxic or anaerobic section of said wastewater treatment system.

13. The method of claim 1, wherein the step of introducing ozone further comprises recycling ozone from at least one section of the wastewater treatment system and introducing the recycled ozone to the sludge in the plug-flow type reactor.

* * * * *